United States Patent
Burwell et al.

[15] 3,694,770
[45] Sept. 26, 1972

[54] LIQUID FUEL GAS DYNAMIC MIXING LASER

[72] Inventors: Wayne G. Burwell, Wethersfield; Charles Oickle, Jr., New Britain, both of Conn.

[73] Assignee: United Aircraft Corporation, East Hartford, Conn.

[22] Filed: Dec. 18, 1970

[21] Appl. No.: 99,439

[52] U.S. Cl..............331/94.5, 330/4.3, 252/466 PT, 23/190, 23/220, 23/212
[51] Int. Cl. .........................H01s 3/22, H01s 3/09
[58] Field of Search .......331/94.5; 23/212, 220, 190; 252/466 PT; 330/4.3; 332/7.51

[56] References Cited

UNITED STATES PATENTS

| | | | |
|---|---|---|---|
| 3,165,382 | 1/1965 | Forte | 23/212 |
| 3,571,747 | 3/1971 | Bronfin et al. | 331/94.5 |
| 3,575,669 | 4/1971 | Haeff | 331/94.5 |

OTHER PUBLICATIONS

"Catalysts for Decomposing Hydrazine," Chem. Abstracts Vol. 56, April 1962 No. 7570C Sayer, International Aerospace Abstracts, Vol. 10, No. 16, Aug. 15, 1970, No. A70– 33603, p. 2,856.

*Primary Examiner*—Ronald L. Wibert
*Assistant Examiner*—R. J. Webster
*Attorney*—Melvin Pearson Williams

[57] ABSTRACT

A liquid fuel is admitted to a catalytic chemical reactor and decomposed to provide high temperature, vibrationally excited nitrogen. The nitrogen is aerodynamically expanded to a condition of low static temperature and carbon dioxide is then admixed. Vibrational energy is transferred from the nitrogen to the carbon dioxide causing a population inversion in the carbon dioxide which emits laser energy in an optical cavity.

10 Claims, 3 Drawing Figures

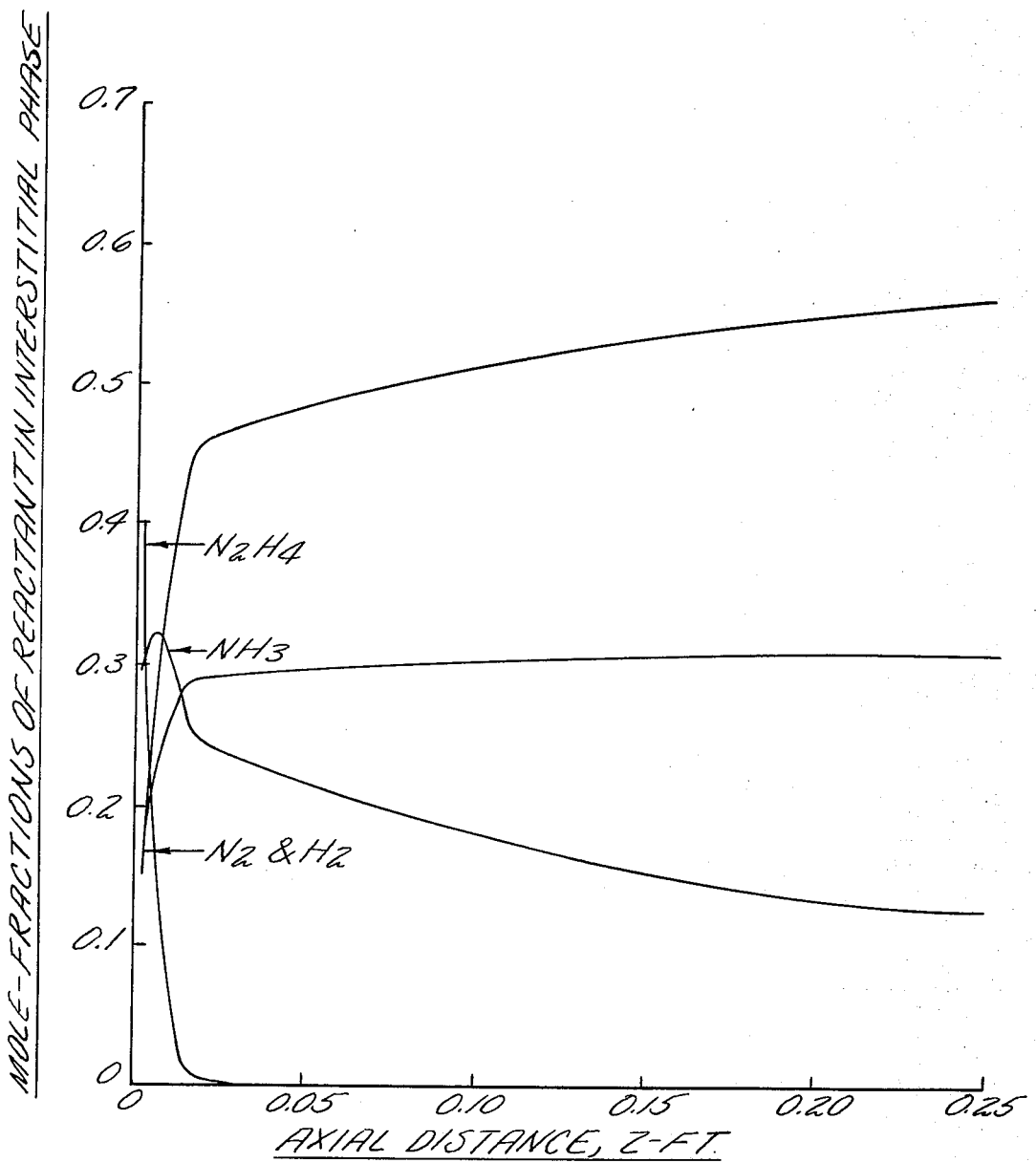

LIQUID FUEL GAS DYNAMIC MIXING LASER

BACKGROUND OF THE INVENTION

1. Field of Invention

This invention relates to lasers and more particularly to gas dynamic mixing lasers.

2. Description of the Prior Art

The continued investigation of laser concepts and devices in the past several years has resulted in sophistication of various laser apparatus currently under development. The gas dynamic laser which has grown out of the initial laser effort, is representative of one of the more sophisticated laser techniques and has the potential of providing very high power radiation output, due primarily to the large gas handling capability characteristic of such a system and to the large quantity of energy which can be added to the gases flowing in such systems.

Gas laser operation requires that a population inversion be established between upper energy levels and lower energy levels of the lasing medium. In a simplified functional description of the carbon dioxide-nitrogen laser, carbon dioxide molecules are excited from the ground vibrational energy level (000) to an upper vibrational energy level (001) — the upper lasing level — by collision with vibrationally ($V=1$) excited nitrogen and then stimulated to emit electromagnetic radiation. The emission causes the carbon dioxide to assume an intermediate vibrational energy level (100) — the lower lasing level — for a period of time before returning to the ground (000) level, passing through a non-laser emitting (010) level in the process. Successfully maintaining the population inversion necessary to laser output requires controlling the rates at which the carbon dioxide molecules pass through all the various energy levels, and unless the 010 level can receive all the 100—010 transitions, the number of carbon dioxide molecules producing laser energy (undergoing the 001—100 transition) is reduced.

The non-emitting 010 level which exists between the lower lasing (100) level and the ground level has a relatively long natural relaxation time and presents a natural bottleneck in the overall carbon dioxide energy exchange process. However, certain relaxant gases such as water vapor, helium or hydrogen readily couple with carbon dioxide at the 010 level producing an alternate energy release mechanism sufficient to avoid the described bottlenecking in the energy exchange processes.

The 001 energy level of a carbon dioxide molecule is preferentially pumped by collision with vibrationally excited nitrogen, due to a naturally occuring match of energy levels between these two gases. In addition to the matched energy level characteristic, nitrogen has a relatively long lifetime in the first vibrational ($V=1$) level (compared to a short lifetime of the carbon dioxide at the corresponding 001 level), and when vibrationally excited nitrogen is mixed with carbon dioxide, the nitrogen preferentially transfers its vibrational energy to carbon dioxide molecules upon collision therewith, the nitrogen reverting to the ground ($V=0$) state and the carbon dioxide assuming an excited or lasable state having a relatively short lifetime.

The gas dynamic laser terminology refers to an excitation or pumping technique whereby tee laser pumping gas such as nitrogen is vibrationally excited. In some of the more desirable working systems, a nitrogen gas is heated from a thermal source, allowing the molecules to assume an equilibrium distribution appropriate for the elevated temperature, and distribution containing a small amount of vibrationally excited nitrogen. The gas molecules are then rearranged in a nonequilibrium distribution by dynamic means by passing them through an aerodynamic expansion nozzle whereby some of the molecules are transferred to the ground vibrational level and some other molecules remain in the first vibrational level due to their relatively long natural relaxation time. The nitrogen which is at supersonic velocity in the nozzle is immediately mixed with carbon dioxide thereby ensuring that the vibrationally excited nitrogen does not revert to the ground state before colliding with and transferring this vibrational energy to the carbon dioxide. The carbon dioxide, in turn, has sufficient velocity to reach the optical cavity while still vibrationally excited. The ability to provide vibrationally excited nitrogen in a gas dynamic manner makes possible large population inversions and in turn the lasing of carbon dioxide.

The gas dynamic laser is a relatively inefficient device, having a thermal energy to laser energy overall conversion efficiency of approximately three fourths of 1 percent; however, if the temperature of the thermally excited gases can be raised sufficiently, the overall conversion efficiency can be increased by a factor of up to approximately 4. Conversion efficiencies much higher than this are unlikely in a simple system because of the inherent characteristic of the various energy transfer processes involved in the production of laser energy with a hot gas in the gas dynamic process. In a typical current system, the extraction efficiency of an optical cavity is approximately 50 percent, the quantum efficiency for the transition of carbon dioxide gas from the 001 level to the 100 level is 41 percent and the temperatures of combustion raise about 3 percent of the population of the exciting nitrogen gas to the first vibrational $V=1$ level, resulting in an overall thermal-to-laser energy conversion efficiency no higher than about three fourths of 1 percent.

Mixtures of carbon dioxide and nitrogen are desirable for the system described due primarily to the physical characteristics of these gases. For a laser application, carbon dioxide is generally provided by the combustion of a limited number of sources, preferably carbon monoxide or cyanogen, and subsequent admixing of nitrogen is required to provide the correct gas mixture prior to expansion through the nozzle. Laser beams of substantial power at a wavelength of approximately 10.6 microns have been produced with the type gas dynamic laser described, however, the gas-handling equipment required is large and a troublesome disadvantage. Gas dynamic lasers inherently consume a large amount of gas and therefore require a substantial array of high pressure gas bottles, gages and associated equipment to produce a laser beam for any sustained duration. A solution to the current problem of bulkiness would appear to be the combustion in air of a carbon containing liquid fuel. Theoretically, the only consumable required in such a system would be the liquid fuel, the air being freely available at the operation site; the carbon in the fuel could provide the necessary carbon dioxide by combustion with the oxygen component of air, and the necessary nitrogen would be unavoidably present due to its natural occurrence as the predominant component of air. However, the combustion of any fuel with air introduces a number of undesired by-products in amounts sufficient to compete with the gas molecule energy transfer required to produce a lasing of the gas mixture. Interference offered by these contaminants reduces the conversion efficiency of available energy to laser energy. In addition, the nitrogen-carbon dioxide molecule ratio is not optimum further reducing the overall performance of such a system; even if a preferred fuel such as carbon monoxide or cyanogen is burned with air, the amount of nitrogen present in the combustion products if below optimum, resulting in a substantial reduction in the amount of lasing energy extractible from such a system.

In order to circumvent the suggested inefficient systems, carbon monoxide and cyanogen gaseous fuels have been combusted with pure oxygen to provide a highly energized source of carbon dioxide or carbon dioxide-nitrogen mixture, and subsequently a controlled quantity of nitrogen is admixed such that the total gas expanded in the gas dynamic laser nozzle is one of the proper proportions to produce the maximum power laser output beam. However, an optimize high output power laser system requires a nitrogen-to-carbon dioxide molecule ratio of approximately 6 to 1 and it is apparent that a system, particularly a carbon monoxide fuel system, relying on the combustion of a fuel in oxygen, requires that an enormous amount of bottled nitrogen accompany the system and be available during operation. Further, the combustibles typically are exhausted to atmosphere after lasing and a new charge of gases is required if subsequent lasing action is desired.

SUMMARY OF THE INVENTION

A principal object of this invention is the production of high power laser energy utilizing nitrogen gas produced by the catalytic decomposition of a liquid fuel.

According to the present invention, a mixture of high temperature nitrogen and other gases is produced by the decomposition of a liquid hydronitrogen fuel in a catalytic reactor, the gases being expanded in a supersonic nozzle and admixed with cooler carbon dioxide to provide a population inversion of vibrational energy levels in the carbon dioxide capable of being stimulated to emit laser radiation.

The present invention eliminates the voluminous storage and handling equipment required for the gaseous fuel and energizing gas in a gas dynamic laser; the necessity of storing toxic and difficult to handle feed gases is avoided also. An additional advantage of this invention is that the energy required to raise the temperature of the nitrogen is inherently provided by the catalytic decomposition process of the liquid fuel providing the nitrogen gas. The decomposition of a hydronitrogen compound produces molecular hydrogen, as well as the nitrogen gas, providing still other advantages; these gases can be chemically reacted with a reactant, releasing heat and raising the temperature of the nitrogen above the temperature of decomposition. Further, the reaction products can provide an energy exchange mechanism beneficial to the lasing of carbon dioxide.

BRIEF DESCRIPTION OF THE DRAWING

FIG. 3 is a graph illustrating the effect of catalytic reactor length on the mole fraction of decomposition products.

DESCRIPTION OF THE PREFERRED EMBODIMENT

Figure 1:
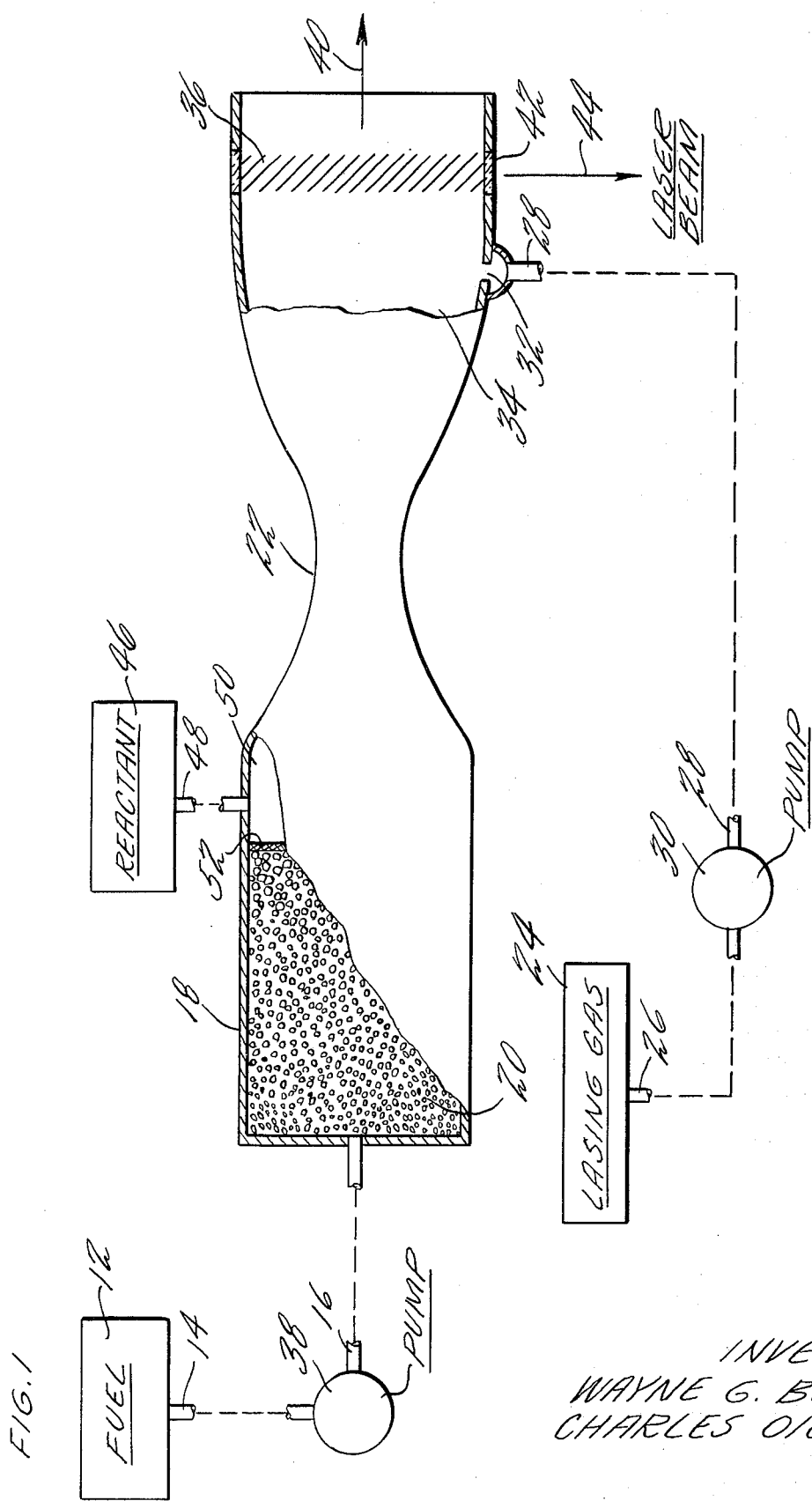
FIG. 1 is a simplified, sectioned, plan view of one embodiment of a gas dynamic mixing laser having a catalytic reactor in accordance with the present invention.

Referring to FIG. 1, a liquid hydronitrogen fuel source 12 communicates by suitable means, such as the connecting pipes 14 and 16 with a chemical catalytic reactor 18 filled with a packed bed 20 comprised of porous alumina substrate which has been impregnated with noble metal. A two dimensional aerodynamic nozzle 22 is attached directly to the reactor 18 in communication with a source 24 of carbon dioxide by suitable means such as pipes 26 and 28. The carbon dioxide may be stored as a high pressure gas in which case there is no need for pump 30. The carbon dioxide is admitted to the nozzle through a slot 32 located in the nozzle wall 34 at a location along the nozzle wall where full expansion of the gases passing therethrough has not yet occurred. An optical cavity 36 is attached to the low pressure side of the nozzle 22 as used herein optical cavity is defined as means for providing amplification of electromagnetic radiation by stimulated emission of radiation from a medium having a suitable population inversion of energy levels.

In the operation of the present invention, the liquid fuel hydrazine is removed from the fuel source 12 through the pipe 14 by pump 38 and transported through the pipe 16 to the chemical reactor 18. In steady state operation, the hydrazine interacts with the catalytic packed bed 20 thereby releasing heat while forming nitrogen, hydrogen and ammonia gases. These hot gases are lowered in pressure and temperature by an expansion across the nozzle 22, and carbon dioxide from the source 24 is admixed with the nitrogen and hydrogen in the nozzle, the carbon dioxide entering the nozzle 22 through slot 32. The gas admixture passes through the optical cavity 36 and discharges as exhaust gas 40, laser energy having been released by the admixture in the optical cavity and removed therefrom through the laser coupling device 42 as laser beam 44. A reactants source 46 communicates by suitable means such as a connecting pipe 48 with a reaction chamber 50 which is located between the packed bed 20 and the aerodynamic nozzle 22. A porous grid 52 separates the packed bed from the reaction chamber.

Hydrazine is a preferred fuel, although other hydronitrogen compounds are suitable. A group of fuels comprising hydrogen azide ($N_3H$), hydrazine azide ($N_5H_5$) and ammonium azide ($N_4H_4$) is suitable for use in this invention since they provide large amounts of nitrogen at even higher temperature than does hydrazine. An additional group of fuels comprising diimide ($N_2H_2$), triazine ($N_3H_3$), diiminohydrazine ($N_4H_2$), bisdiazoamine ($N_5H_3$), hexazodiazene ($N_6H_4$), heptazodiazene ($N_7H_5$) and octazotriene ($N_8H_4$) is also suitable for use with this invention since each fuel in this group provides a larger proportion of nitrogen at higher temperature than does hydrazine.

A reduction of one hundred degrees Rankine in the temperature of the nitrogen gas leaving the reactor has been found to produce a one half percent reduction in the number of vibrationally excited nitrogen gas molecules. Under the best catalytic conditions, the products of hydrazine are formed as a gas at a peak temperature of about 2,100° R. This temperature is ample to ensure a laser device of acceptable output power, however, if the temperature were to be reduced significantly, the practicality of the system would be questionable; the temperature condition below which this system will produce essentially no useful power is about 1,200° R. If the catalytic reactor is forced, that is, the reactor length is increased to ensure complete conversion of the input fuel to the end products theoretically attainable, the temperature of the gases would be lower than the peak temperature, perhaps as much as 300° R lower.

There are distinct advantages to the operation of a gas dynamic mixing laser as contrasted with a gas dynamic laser. For example, in the former, the gas expanded is largely nitrogen having a relatively long relaxation time for the vibrationally excited (V=1) level, and the population inversion established during expansion can therefore be maintained over relatively long linear distances downstream of the nozzle for a given gas velocity. In the gas dynamic laser, however, the gas expanded is a mixture of nitrogen and carbon dioxide, the latter having a relatively short relaxation time for the vibrationally excited (V=1) level and therefore requiring that the optical cavity be physically near the expansion nozzle. Unless the transit time for the expanded gases from the nozzle to the optical cavity is less than the decay time for the 100 level carbon dioxide, the population inversion is lost before the gas enters the optical cavity and the depleted gas does not lase. Also, in the mixing configuration the carbon dioxide is injected at a relatively cold temperature, resulting in only a minimal population of the carbon dioxide lower energy levels before lasing activity is initiated. Mixing the carbon dioxide at a temperature of approximately 550° R avoids having the lower vibrational levels of the carbon dioxide occupied due to the thermal activity of the gas. Perhaps more importantly, the mixing laser inherently is a higher efficiency device; in a non-mixing system, all the gases are premixed prior to expansion and the pumping gas, typically nitrogen, is subjected to energy loss mechanisms by collision with the other gases present. These collisions result in a decrease in overall conversion efficiency since energy which would otherwise be available for lasing is transferred from the nitrogen by the collision processes before expansion occurs. There is an optimum temperature above which the amount of energy which is being lost by the collision processes is greater than the amount of additional vibrational energy which is being transferred to the nitrogen pumping gas. In a mixing system, however, the pumping gas is heated while still segregated from the remaining gases and theoretically the higher the temperature of the pumping gas prior to expansion, the higher the potential conversion efficiency of the system.

In the present invention with hydrazine fuel, ammonia and hydrogen product gases are present during the nitrogen expansion, however, they do not interact with the nitrogen in exactly the same manner as does carbon dioxide. Actually, these product gases can provide certain advantages to the mixing laser concept. For example, they can be reacted in the chamber 50 with a reagent such as hydrogen peroxide, chlorine trifluoride or chlorine pentafluoride, thereby decreasing the amount of product gas and increasing the temperature of the nitrogen stream. Also, some of the reactions produce water molecules which promote relaxation of the 010 (bottleneck) level of carbon dioxide. The presence of some water in the lasing gas mixture is advantageous, however, too much water is undesirable. There is no sharp upper limit on the tolerable amount of water, but if the lasing gases comprise more than about 10 percent by volume of water vapor, the system power output decreases appreciably. On the other hand, ammonia in particular, accepts vibrational energy from the carbon dioxide and can put a constraint on the overall system design. The presence of ammonia in amounts of up to about one percent of the total gas flow through the nozzle is acceptable; in higher proportions, the ammonia begins to significantly reduce the output power from the lasing cavity. In this invention, the amount of ammonia in the gas can exceed one percent, however, the energy loss mechanism described is avoided in much the same manner as the gas dynamic laser system avoids loss of the vibrational energy in the carbon dioxide molecules. The optical cavity is placed at a short distance from the nozzle exit such that the ammonia does not deplete a substantial amount of the excited carbon dioxide molecules before said molecules have entered the cavity region. The azide fuels produce relatively less ammonia at elevated temperature than hydrazine fuel and they are desirable in this respect.

The design of the chemical reactor wherein the catalytic decomposition of the hydrazine takes place represents an engineering compromise. The breakdown of hydrazine theoretically produces pure hydrogen and nitrogen; as a practical matter, ammonia is also formed since the reaction does not go to completion, and the amount of ammonia so formed can be substantial if the catalytic reactor is overly short. The independent variable in the reactor design is the length of the catalytic bed through which the hydrazine fuel is allowed to pass in the process of decomposing into its constituent elements; dependent variables are the temperature of the gases produced and the mole fraction of the gases hydrogen, nitrogen, ammonia, and hydrazine.

Figure 2:
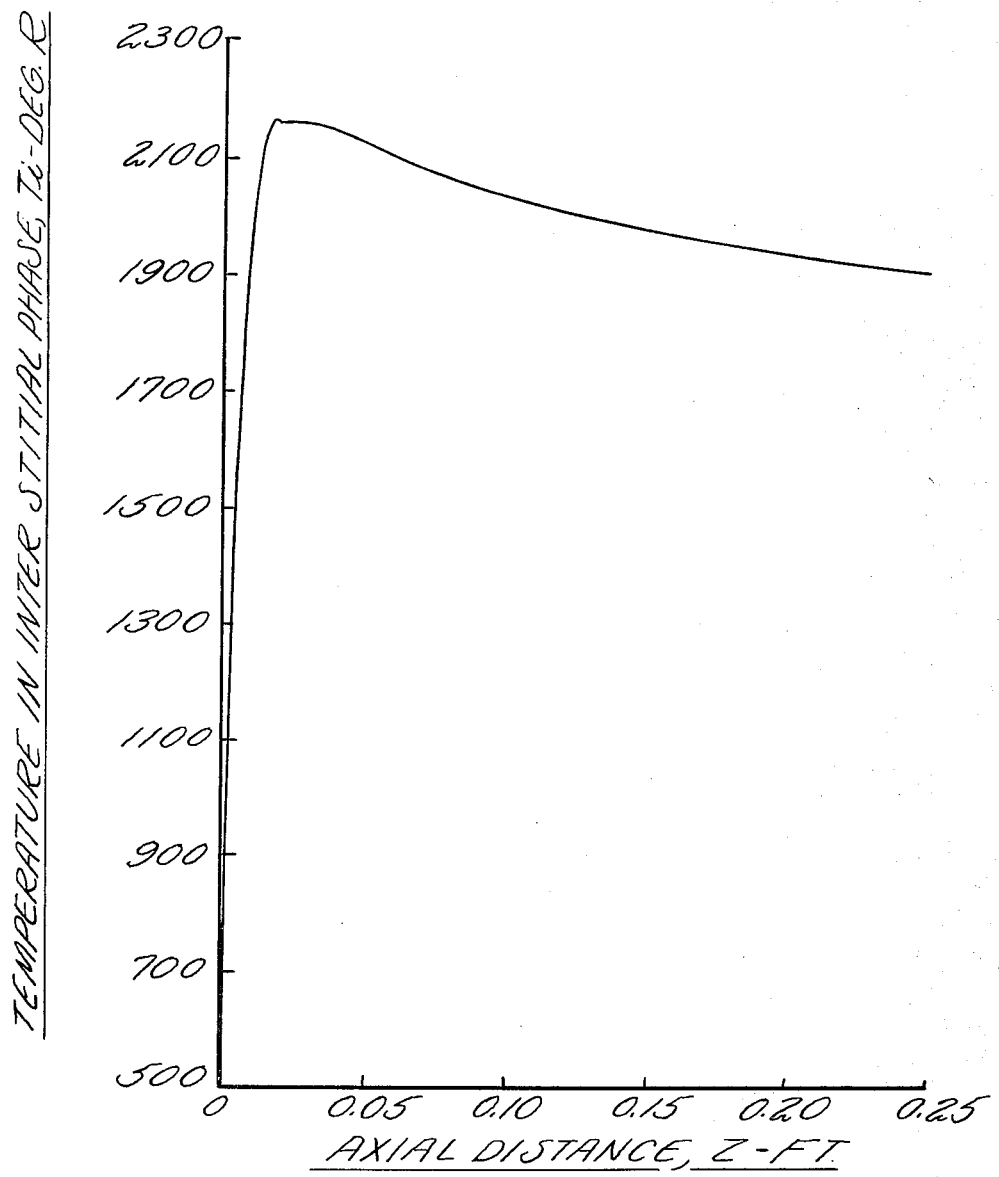
FIG. 2 is a graph illustrating the effect of catalytic reactor length on the temperature of the decomposed products.

A curve of the temperature of the decomposed gases as a function of the catalytic reactor length is shown in FIG. 2. From these data, temperature considerations indicate that a relatively short reactor approximately three tenths of an inch in length would be preferred since an effluent gas having a temperature of approximately 2,150° R would be provided. However, from FIG. 3 it is apparent that a reactor of this length would produce an effluent gas mixture having an undesirably high ammonia mole fraction. The data of FIG. 3 indicates further that as the reactor length is increased, the ammonia content in the gases is decreased. Therefore, from a gas composition point of view, a reactor much longer than three tenths of an inch is desired. As a practical matter, the reactor length is established by selecting a maximum temperature which does not allow the reactor to yield an unacceptably high mole fraction of ammonia.

An additional consideration in the reactor design, is the pressure drop introduced by the catalytic bed in the flowing hydrazine stream. The longer the bed becomes for a given set of conditions, the greater is the pump work required to overcome this pressure drop. The porous bed, comprised of a commercial catalyst obtained under the name of Shell 405, has been found to perform satisfactorily in the reactor. This catalyst comes in a variety of sizes and shapes; cylindrical pellets one eighth inch in both diameter and length have been found to be a practical selection. When the catalyst size becomes smaller than one eighth inch, the fuel is decomposed very efficiently but there is a relatively large pressure drop across the packed bed of the reactor; alternatively, larger size pellets tend to result in inefficient use of the fuel and a low pressure drop. The composition and method of manufacturing the Shell 405 catalyst is proprietary, however, the material is substantially a porous alumina substrate covered by metal which is essentially iridium. Any of the noble metals should function as an effective catalyst.

The nozzle design required in the operation of this invention must meet a few simple criteria. It has been found, for example, that the length of the nozzle must be such that, having considered the velocity of the gases being expanded through the nozzle, the relaxation time of the vibrational mode for the gas must be greater than the residence time of the gas in the nozzle. Failure to satisfy this criterion allows the gas to relax before exiting the nozzle and since the relaxed or de-excited gas is unable to selectively pump the lasing gas, no lasing action occurs. This subject is discussed more fully in Anderson, John D. Jr., Time-Dependent Analysis of Population Inversions in an Expanding Gas, The Physics of Fluids, Vol. 13, No. 8, August 1970, p. 1,983.

It has been found also that if the nozzle expansion surfaces are not continued (in the direction of the gas flow) beyond the point at which the carbon dioxide lasing gas is injected, admixing carbon dioxide to the flowing gas stream causes the stream temperature to rise; without expansion after injection, some of the carbon dioxide becomes thermally excited into the 010 level, an undesirable condition for lasing of the carbon dioxide gas.

A third limitation upon the nozzle design requires a short physical separation between the point of admixing and the optical cavity. When ambient temperature carbon dioxide is admixed with a flowing stream of nitrogen having a population inversion consisting of vibrationally excited molecules, the carbon dioxide undergoes a rapid energy exchange with the nitrogen, the carbon dioxide being selectively pumped into the upper lasing 001 level. The lifetime for carbon dioxide at this energy condition is very short and unless a short nozzle is used together with very high velocity gas streams through the nozzle, much of the 001 carbon dioxide gas relaxes before this gas is passed from the mixing region to the optical cavity region where the laser energy can be extracted.

The injection of the carbon dioxide gas should not occur until the static temperature (the actual temperature of the gas not considering the kinetic energy of the molecule) of the nitrogen is at a level (approximately ambient temperature) that ensures the carbon dioxide will not be thermally heated to the 100 level. As a practical matter, the static temperature is about the same as the carbon dioxide gas injection temperature. The subject is discussed more fully in Bronfin, B. R., Boedeker, L. R., and Cheyer, J. R., Thermal Laser Excitation by Mixing in a Highly Convective Flow, Applied Physics Letters, Vol. 16, No. 5, March 1, 1970, p. 214.

Although the invention has been shown and described with respect to preferred embodiments thereof, it should be understood by those skilled in the art that the foregoing and various changes and omissions in the form and detail thereof may be made therein without departing from the spirit and the scope of the invention.

Having thus described typical embodiments of our invention, that which we claim as new and desire to secure by Letters Patent of the United States is:

1. The method of providing laser energy in a gas dynamic mixing laser utilizing nitrogen as an excitation gas and carbon dioxide as a lasing gas, comprising the steps of:

decomposing a liquid hydronitrogen fuel by an exothermic reaction in a catalytic chemical reaction chamber to form a gas mixture including nitrogen gas molecules which are at thermal equilibrium;

rapidly expanding the gas mixture in an aerodynamic nozzle from a static temperature not less than about 1,200° R to a static temperature of approximately 550° R to establish a nonequilibrium condition in the vibrational energy levels of the nitrogen gas;

admixing carbon dioxide which is at a temperature no greater than about 550° R to the expanded gas mixture in the nozzle to form a gas admixture in which energy contained in the vibrational energy levels of the nitrogen is transferred by collision processes to the carbon dioxide, to establish a population inversion in the vibrational energy levels of the carbon dioxide molecules;

passing the gas admixture through an optical chamber stimulating emission of radiation from said molecules while in said chamber;

exhausting the gas admixture from the optical chamber.

2. The method according to claim 1 further comprising, between the step of admixing carbon dioxide and the step of passing the gas admixture through an optical chamber, the additional step of:

expanding the gas admixture in a nozzle sufficiently to ensure a static temperature of the gases exiting the nozzle of approximately 550° R.

3. The method according to claim 2 wherein the fuel is selected from the group consisting of hydrazine, hydrogen azide, hydrazine azide, ammonium azide, diimide, triazine, diiminohydrazine, bisdiazoamine, hexazodiazene, heptazodiazene and octazotriene.

4. The method according to claim 2 wherein the fuel is hydrazine.

5. The method according to claim 2 wherein the fuel is selected from the group consisting of hydrogen azide and hydrazine azide.

6. The method of providing laser energy in a gas dynamic mixing laser utilizing nitrogen as an excitation gas and carbon dioxide as a lasing gas comprising the steps of:

decomposing a liquid hydronitrogen fuel by an exothermic reaction in a catalytic chemical reaction chamber to form a gas mixture which includes nitrogen gas molecules at thermal equilibrium and an additional gas;

reacting the gas mixture with a reagent to increase the temperature of the gases entering the nozzle and to reduce the amount of said additional gas present;

rapidly expanding the gas mixture in an aerodynamic nozzle from a static temperature not less than about 1,200° R to a static temperature of approximately 550° R to establish a nonequilibrium condition in the vibrational energy levels of the nitrogen gas;

admixing carbon dioxide which is at a temperature no greater than about 550° R to the expanded gas mixture in the nozzle to form a gas admixture in which energy contained in the vibrational energy levels of the nitrogen is transferred by collision processes to the carbon dioxide, thereby establishing a population inversion in the vibrational energy levels of the carbon dioxide molecules;

expanding the gas admixture in a nozzle sufficiently to ensure a static temperature of the gas exiting the nozzle of approximately 550° R;

passing the gas admixture through an optical chamber stimulating emission of radiation from said molecules while in said chamber;

exhausting the gas admixture from the optical chamber.

7. The method according to claim 6 wherein the additional gas is hydrogen.

8. The method according to claim 7 wherein the hydrogen is chemically reacted with a reagent to form water, thereby increasing the temperature of the gases entering the nozzle and reducing the amount of hydrogen present, the amount of hydrogen so reacted being limited so that the water formed comprises no more than approximately 10 percent by volume of the gas mixture in the optical chamber.

9. The method according to claim 6 wherein the additional gas is ammonia.

10. The method according to claim 9 wherein the ammonia is chemically reacted with a reagent to form water and nitrogen, thereby increasing the temperature of the gases entering the nozzle and reducing the amount of ammonia present, the amount of ammonia so reacted being limited so that the water formed comprises no more than approximately 10 percent by volume of the gas mixture in the optical chamber.

* * * * *

PO-1050
(5/69)

UNITED STATES PATENT OFFICE
CERTIFICATE OF CORRECTION

Patent No. 3,694,770　　　　　　　　Dated September 26, 1972

Inventor(s) Wayne G. Burwell and Charles Oickle, Jr.

It is certified that error appears in the above-identified patent and that said Letters Patent are hereby corrected as shown below:

Claim 1, column 8, line 51 - after "chamber," insert --and--

Claim 6, column 10, line 2 - delete "gas" and insert --gases--

Claim 6, column 10, line 6 - after "chamber;" insert --and--

Signed and sealed this 13th day of February 1973.

(SEAL)
Attest:

EDWARD M. FLETCHER, JR.　　　　　　　ROBERT GOTTSCHALK
Attesting Officer　　　　　　　　　　Commissioner of Patents